(12) United States Patent
Maruyama et al.

(10) Patent No.: US 9,573,447 B2
(45) Date of Patent: Feb. 21, 2017

(54) VEHICLE BACK DOOR DEVICE WITH DAMPER STAY STORAGE STRUCTURE

(71) Applicant: KABUSHIKI KAISHA TOYOTA JIDOSHOKKI, Kariya-shi, Aichi-ken (JP)

(72) Inventors: Katsuya Maruyama, Kariya (JP); Yusuke Matsumoto, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 14/867,067

(22) Filed: Sep. 28, 2015

(65) Prior Publication Data

US 2016/0096419 A1   Apr. 7, 2016

(30) Foreign Application Priority Data

Oct. 1, 2014   (JP) .................................. 2014-202837

(51) Int. Cl.
  *B60J 5/10*   (2006.01)
(52) U.S. Cl.
  CPC ............... *B60J 5/107* (2013.01); *B60J 5/101* (2013.01)
(58) Field of Classification Search
  CPC ..... B60J 5/10; B60J 5/101; B60J 5/106; B60J 5/107
  USPC ................ 296/146.4, 146.8, 146.11, 56, 106
  See application file for complete search history.

(56) References Cited

U.S. PATENT DOCUMENTS

| 6,089,640 | A  | * | 7/2000 | Cart ........................ | B60J 1/1884 |
| | | | | | 296/146.11 |
| 8,556,322 | B2 | * | 10/2013 | Babbage ............ | G02B 27/2214 |
| | | | | | 296/146.8 |
| 2006/0022486 | A1 | * | 2/2006 | Kalmbach ................ | B60J 5/107 |
| | | | | | 296/146.8 |
| 2009/0273207 | A1 | * | 11/2009 | Lewis ...................... | B60J 5/101 |
| | | | | | 296/190.11 |
| 2010/0259067 | A1 | * | 10/2010 | Bell ........................ | B60J 5/0473 |
| | | | | | 296/146.11 |

(Continued)

FOREIGN PATENT DOCUMENTS

| JP | 63159131 A |   | 7/1988 |
| JP | 3-121925 | * | 5/1991 |

(Continued)

OTHER PUBLICATIONS

Communication dated Oct. 18, 2016, issued by the Japan Patent Office in corresponding Japanese Application No. 2014-202837.

*Primary Examiner* — Gregory Blankenship
(74) *Attorney, Agent, or Firm* — Sughrue Mion, PLLC

(57) ABSTRACT

A back door device includes a hinge, a back door, and a damper stay. The hinge is provided on a roof of a vehicle and arranged at a position forward of a rear edge of the roof. The back door is configured to pivot vertically about the hinge to selectively open and close a door opening and includes a back door rear end portion and a back door roof portion. The back door roof portion includes a storage projection, which projects upward from an upper surface of the back door roof portion. The damper stay includes a first end, which is connected to the roof at a position rearward of the hinge, and a second end, which is connected to an inner wall of the storage projection. When the back door is closed, the damper stay is stored in the storage projection.

5 Claims, 5 Drawing Sheets

(56) References Cited

U.S. PATENT DOCUMENTS

| | | | | |
|---|---|---|---|---|
| 2011/0241376 A1* | 10/2011 | Igura | ................. | B60J 5/101 296/146.3 |
| 2012/0066977 A1* | 3/2012 | Sitzler | ................. | E05F 15/622 49/358 |
| 2013/0055639 A1* | 3/2013 | Brosseit | ................. | B60J 5/101 49/31 |
| 2014/0077525 A1* | 3/2014 | Yoshimura | ................. | B62D 35/007 296/180.1 |
| 2014/0175828 A1* | 6/2014 | Lechkun | ................. | B60J 5/106 296/146.8 |
| 2014/0203591 A1* | 7/2014 | Lathwesen | ................. | B60J 5/107 296/146.8 |
| 2016/0096419 A1* | 4/2016 | Maruyama | ................. | B60J 5/101 296/146.8 |

FOREIGN PATENT DOCUMENTS

| | | | |
|---|---|---|---|
| JP | 537531 U | 5/1993 |
| JP | 6144290 A | 5/1994 |
| JP | 2000-158942 A | 6/2000 |
| JP | 2003-269039 A | 9/2003 |
| JP | 2004-150170 A | 5/2004 |
| JP | 2009-234417 A | 10/2009 |
| JP | 2012254677 A | 12/2012 |

* cited by examiner

VEHICLE BACK DOOR DEVICE WITH DAMPER STAY STORAGE STRUCTURE

BACKGROUND OF THE INVENTION

The present invention relates to a back door device for vehicles such as minivans, and more particularly, to a back door device having a damper stay storage structure for storing a damper stay that urges a back door at the rear end of the vehicle in the opening direction.

For example, Japanese Laid-Open Patent Publications No. 2009-234417 and No. 2003-269039 disclose such back door devices with damper stay storage structures. In the techniques disclosed in the publications, a door opening at the rear end of a vehicle is selectively opened and closed by vertically pivoting a back door.

The technique disclosed in Japanese Laid-Open Patent Publication No. 2009-234417 includes a damper stay at each end of the door opening in the vehicle width direction. Each damper stay is connected to a part of the vehicle body adjacent to the side of the door opening and also connected to the side of the back door to urge the back door in the opening direction. The urging force reduces the operating load on the user when opening the back door. The damper stays are stored in the edges on both sides of the door opening in the vehicle width direction.

Japanese Laid-Open Patent Publication No. 2003-269039 discloses a technique in which a hinge arm, which extends from the vehicle interior, is connected to the back door. The proximal end of the hinge arm is coupled to a damper stay and a slide member, which are stored in the vehicle roof, via separate shaft members. The damper stay urges the back door in the opening direction via the hinge arm. The slide member is driven by a motor to reciprocate. As the slide member reciprocates, the hinge arm pivots, which allows the back door to pivot upward while being assisted by the urging force of the damper stay.

Since the technique of Japanese Laid-Open Patent Publication No. 2009-234417 requires a damper stay storage space on each side of the door opening in the vehicle width direction, the width of the door opening is narrowed accordingly. In the technique of Japanese Laid-Open Patent Publication No. 2003-269039, the damper stay is stored in the vehicle roof, allowing the width of the door opening to be increased. Nevertheless, the link members such as the hinge arm between the damper stay and the back door complicates the connecting structure of the damper stay. Also, the damper stay and other components, which are stored in the vehicle roof, cause the roof panel facing the passenger compartment to bulge inward, narrowing the field of rearward view.

SUMMARY OF THE INVENTION

Accordingly, it is an objective of the present invention to provide a vehicle back door device with a simple structure that prevents the width of the door opening, which is selectively opened and closed by a vertically pivotal back door, from being narrowed and the field of rearward view from being narrowed.

To achieve the foregoing objective and in accordance with one aspect of the present invention, a back door device is provided that includes a hinge, which is provided on a roof of a vehicle, a back door, which is configured to pivot vertically about the hinge to selectively open and close a door opening provided at a rear end of the vehicle, and a damper stay, which urges the back door in an opening direction. The hinge is arranged at a position forward of a rear edge of the roof. The back door includes a back door rear end portion and a back door roof portion. When the back door is closed, the back door rear end portion forms at least a part of the rear end of the vehicle and the back door roof portion covers a part of the roof that is rearward of the hinge. The back door roof portion includes a storage projection, which projects upward from an upper surface of the back door roof portion such that the storage projection is capable of storing therein the damper stay. The damper stay includes a first end, which is connected to the roof at a position rearward of the hinge, and a second end, which is connected to an inner wall of the storage projection. When the back door is closed, the damper stay is stored in the storage projection.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
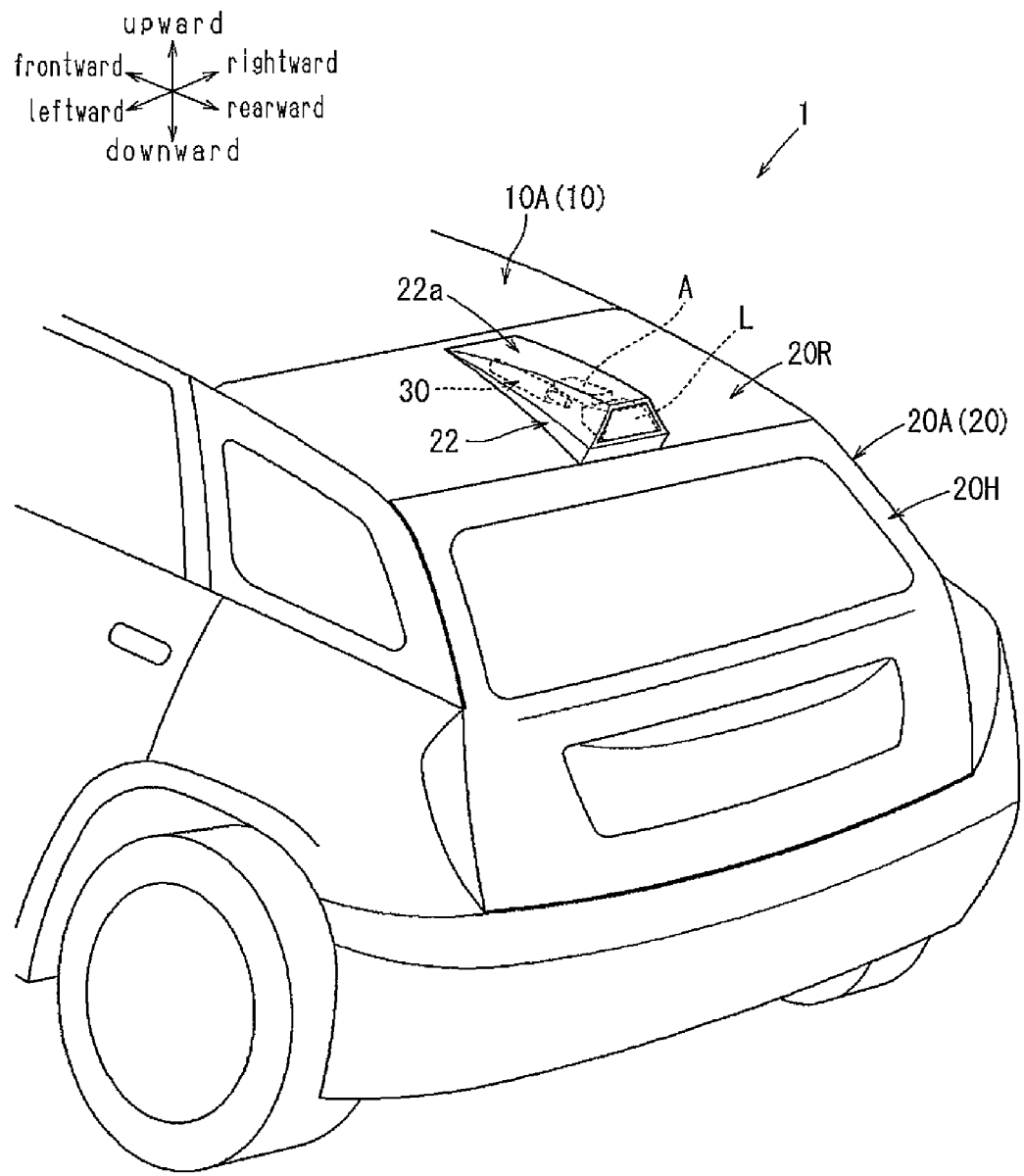
FIG. 1 is a perspective view illustrating the appearance of a vehicle rear equipped with a storage projection according to a first embodiment.
Figure 2:
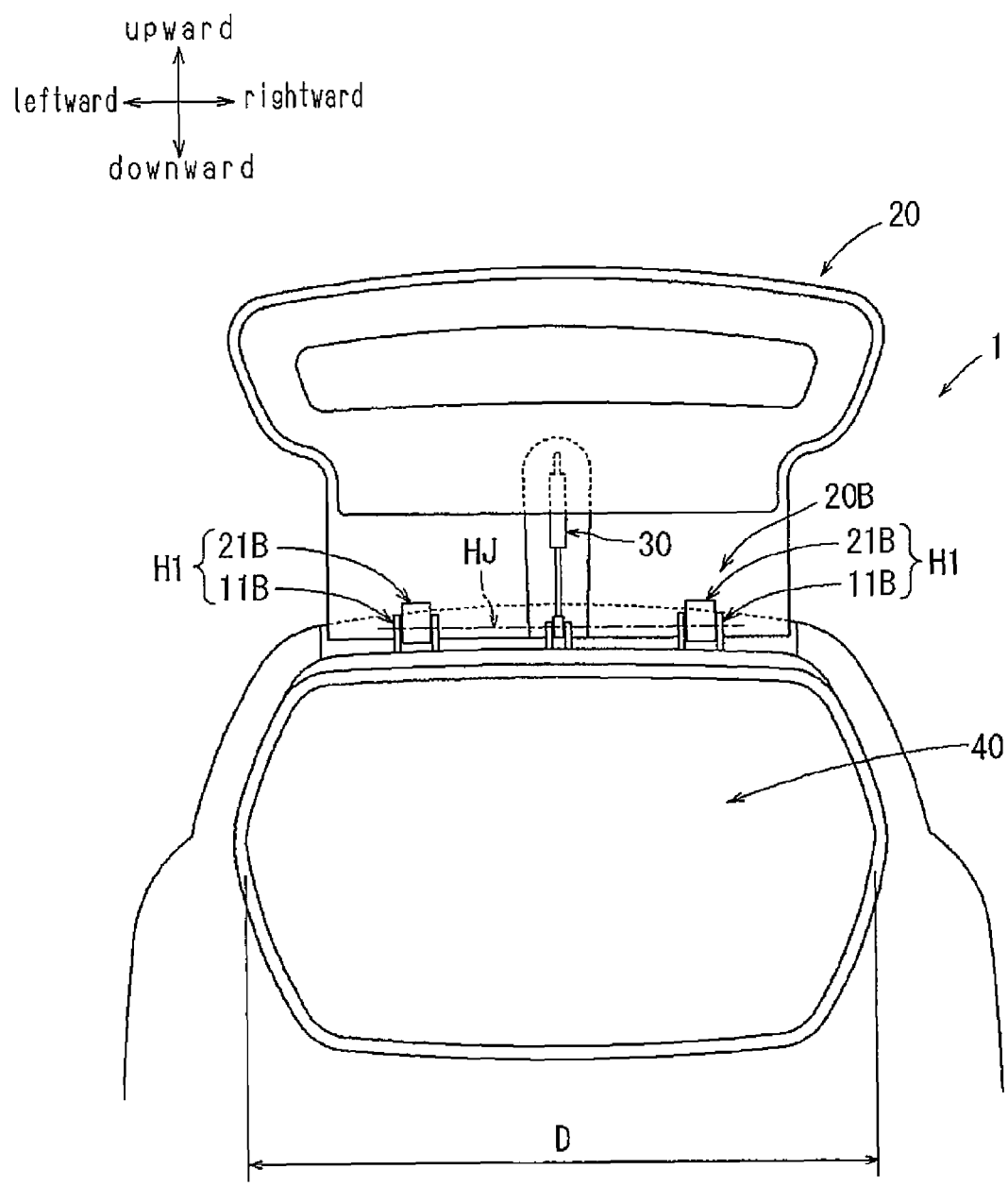
FIG. 2 is a rear view of the vehicle rear shown in FIG. 1, illustrating a state in which the back door is open.
Figure 3:
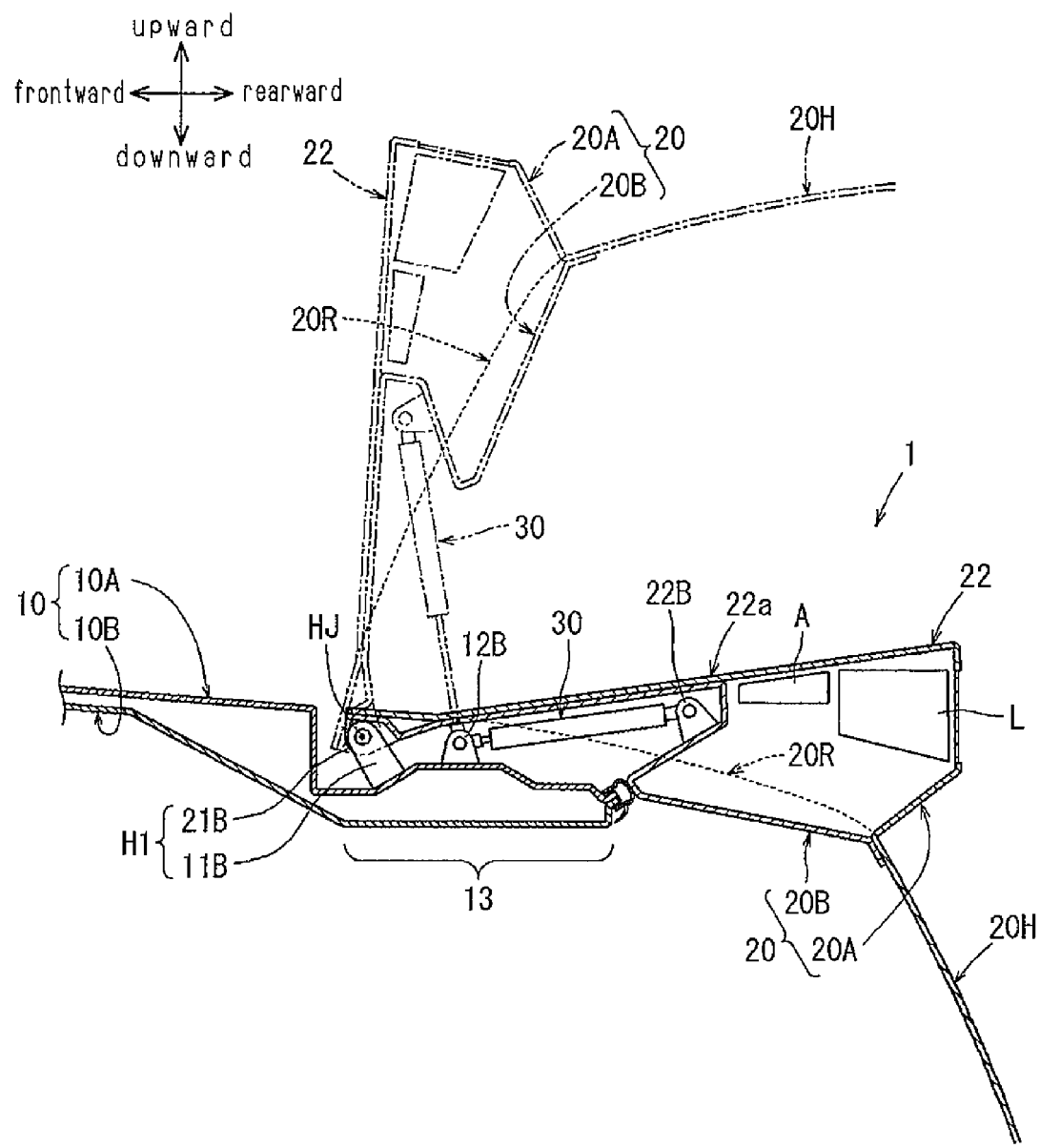
FIG. 3 is a cross-sectional view of the vehicle shown in FIG. 1, taken along a center line in the vehicle width direction.

Hereinafter, a first embodiment of the present invention will be described with reference to the drawings. The drawings illustrate a vehicle 1, which is equipped with a damper stay storage structure. In the following description, the front-rear direction of the vehicle 1 will be referred to simply as "front-rear direction," the width direction of the vehicle 1 will be referred to simply as "width direction," and the vertical direction of the vehicle will be referred to simply as "vertical direction." As shown in FIGS. 1 to 3, the vehicle 1 includes a roof 10 and a back door 20. The roof 10 includes a roof outer panel 10A, which is a panel on the vehicle outer side, and a roof inner panel 10B, which is panel facing the passenger compartment. The vehicle 1 has a damper storing portion 13 in a part of the roof 10 close to the rear end. The damper storing portion 13 is formed by recessing the roof outer panel 10A into the passenger compartment (see FIG. 3). The back door 20 includes a back door outer panel 20A, which is a panel on the vehicle outer side, and a back door inner panel 20B, which is a panel facing the passenger compartment. The roof 10 includes a reinforcing cross member (not shown).

As shown in FIGS. 2 and 3, a hinge H1 is provided at each end of the roof 10 in the width direction. The hinges H1 have a common rotational axis HJ. The back door 20 vertically pivots about the rotational axis HJ to selectively open and close a door opening 40 located at the rear end of the vehicle 1 (see FIG. 2). The hinges H1 are located on the upper surface of the roof 10 at positions forward of the rear edge of the roof 10, which forms a part of the door opening 40. That is, the hinges H1 are located in a damper storing portion 13 (see FIG. 3), which will be discussed below. Each hinge H1 is configured by a first hinge member 11B and a second hinge member 21B. As shown in FIGS. 2 and 3, the first hinge member 11B is located on the roof outer panel 10A, and the second hinge member 21B is located on the back door inner panel 20B. As shown in FIG. 2, two sets of the first hinge member 11B and the second hinge member 21B, that is, the hinges H1 are provided on the left and right sides of the center of the vehicle 1 in the width direction. The second hinge member 21B is located on the front edge of the back door inner panel 20B as shown in FIG. 3, and the first hinge member 11B is located on the roof outer panel 10A at a position corresponding to the second hinge member 21B.

The back door 20 pivots about the rotational axis HJ of the above described hinges H1 to selectively open and close the door opening 40 (see FIG. 2). The back door 20 includes a back door rear end portion 20H and a back door roof portion 20R. The back door 20 will now be described, assuming that the back door 20 is closed (refer to solid lines in FIGS. 1 and 3). The back door rear end portion 20H forms at least part of the rear end surface of the vehicle 1. The back door roof portion 20R covers a part of the roof 10 that is rearward of the hinges H1 (the damper storing portion 13) and forms the roof 10 at a position rearward of the roof inner panel 10B. The upper surface of the back door roof portion 20R and the upper surface of the roof 10 are substantially flush with each other except for a storage projection 22, which will be discussed below.

As shown in FIGS. 1 and 3, the back door roof portion 20R includes the storage projection 22, which projects upward when the back door 20 is closed and is configured to store therein a damper stay 30. The storage projection 22 is located at the center of the vehicle 1 in the width direction. An upper surface 22a of the storage projection 22 is formed to rise toward the rear end in relation to the upper surface of the back door roof portion 20R. In the example of FIG. 3, the upper surface 22a of the storage projection 22 is formed to rise toward the rear end also in relation to the horizontal plane.

As shown in FIGS. 1 and 3, the storage projection 22 stores therein the damper stay 30, which urges the back door 20 in the opening direction. In the example of FIG. 3, the damper stay 30 is arranged to extend along the upper surface 22a of the storage projection 22. Since the inside of the storage projection 22 is used for storing the damper stay 30, it is not necessary to provide a space for storing the damper stay 30 at either end of the door opening 40 in the width direction as in the prior art. This allows an opening width D (see FIG. 2) of the door opening 40. Also, since the damper stay 30 is stored in the storage projection 22, the damper stay 30 does not protrude into the passenger compartment when stored. As a result, the roof inner panel 10B does not bulge into the passenger compartment, so that a wide field of rearward view is ensured.

As shown in FIG. 3, a damper connecting member 22B is fixed to the back door 20 (specifically, the back door inner panel 20B) at a position rearward of the rear edge of the roof 10. One end of the damper stay 30 is pivotally connected to the damper connecting member 22B. Also, a damper connecting member 12B is fixed to the roof outer panel 10A at a position inside the storage projection 22, that is, in the damper storing portion 13. The other end of the damper stay 30 is connected to the damper connecting member 12B to pivot vertically. In other words, the damper stay 30 has a first end, which is connected to the roof 10 at a position rearward of the hinges H1, and a second end, which is connected to the inner wall of the storage projection 22. The second end is located rearward of the first end. That is, the connecting structures at the opposite ends of the damper stay 30 are simple without any link members. The damper stay 30 includes a cylinder, which is filled with gas or the like, and a rod, which is retractable into the cylinder. The rod is constantly urged by the gas in the projecting direction. The urging force of the damper stay 30 urges the back door 20 in the opening direction.

As shown in FIGS. 1 and 3, the damper stay 30 is located at the center of the vehicle 1 in the width direction, in correspondence with the position of the storage projection 22. Thus, the damper stay 30 is capable of applying an urging force to the back door 20 in the opening direction, substantially evenly with respect to the width direction. As a result, the damper stay 30 supports the back door 20 in a balanced manner and prevents the opening and closing operations of the back door 20 from being degraded. Also, when the back door 20 is open (see long dashed double-short dashed lines in FIGS. 2 and 3), the damper stay 30 stably supports the back door 20.

As shown in FIGS. 1 and 3, the storage projection 22 has therein a space for accommodating various in-vehicle devices in addition to the damper stay 30. For example, the storage projection 22 accommodates a car antenna A, which receives various types of radio waves, and a high mount stop lamp L, which is a taillight of the vehicle 1. Since the damper stay 30 and these in-vehicle devices A, L are accommodated in the storage projection 22, the efficiency for installation is improved compared to a case in which the in-vehicle devices A, L are installed at different positions. Also, the components that would be necessary if the in-vehicle devices A, L were installed at positions different from the storage projection 22, for example, a member for covering the car antenna A, are unnecessary. The number of components is thus reduced.

The storage projection 22 is integrally molded with the back door roof portion 20R of the back door 20 (specifically, the back door outer panel 20A). Thus, the number of components is reduced compared to a case in which the storage projection 22 and the back door roof portion 20R are molded separately in advance. Unlike the present embodiment, in which the storage projection 22 and the back door roof portion 20R are integrally molded, the storage projection 22 and the back door roof portion 20R may be molded separately and thereafter integrated with each other (coupled to each other).

Figure 4:
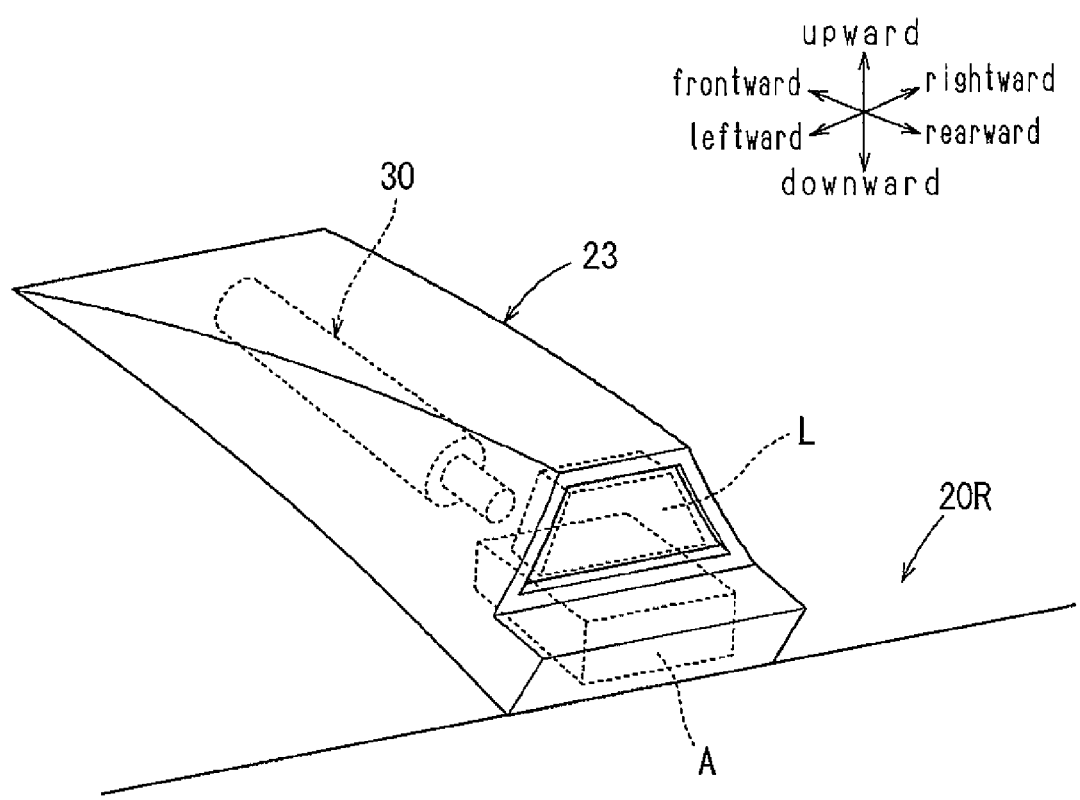
FIG. 4 is a perspective view illustrating a storage projection according to a second embodiment.

The best mode for carrying out the invention has been described with reference to the drawings. Nevertheless, the described embodiment can be easily modified without departing from the scope of the present invention. For example, in the above illustrated embodiment, the car antenna A and the high mount stop lamp L are arranged in the front-rear direction in the storage projection 22 (see FIGS. 1 and 3). However, the in-vehicle devices A and L may be arranged vertically. For example, a second embodiment shown in FIG. 4 includes a storage projection 23 having a shape with a cutout section at the rear upper end, in which a car antenna A and a high mount stop lamp L are arranged vertically. As shown in FIG. 4, the high mount stop lamp L does need to be arranged at the rear end of the storage projection 23.

In-vehicle devices that are stored in the storage projection 22 (see FIGS. 1 and 3) are not limited to the car antenna A and the high mount stop lamp L, but may include a back door control device, which automatically and selectively opens and closes the back door 20 using the drive force of a motor or the like, and a battery, which stores electricity generated by in-vehicle solar panels. Further, as long as the in-vehicle devices include at least one of the car antenna A and the high mount stop lamp L, the number of the in-vehicle devices stored in the storage projection 22 is not limited to two, but may be one or more than two.

Figure 5:
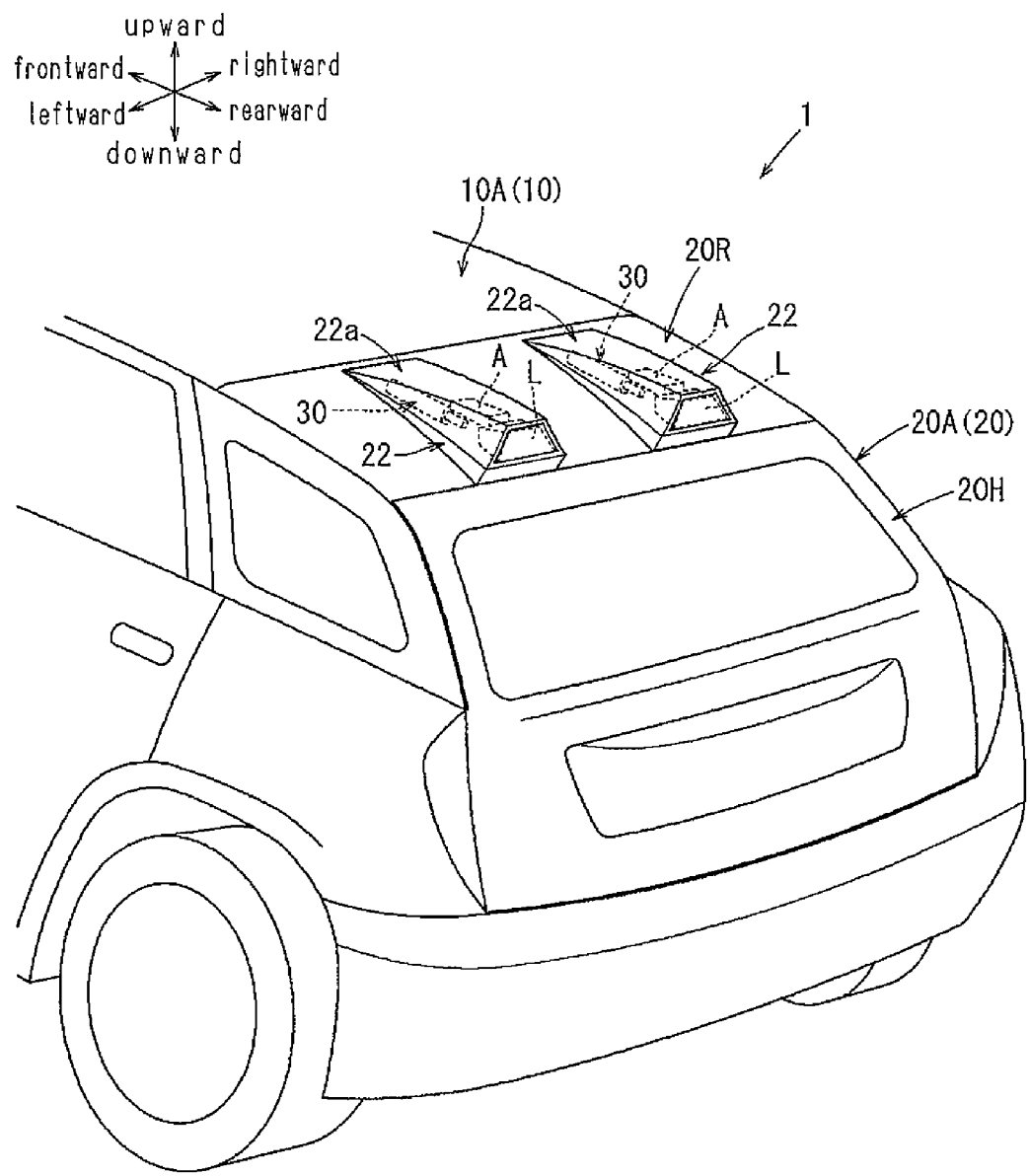
FIG. 5 is a perspective view illustrating the appearance of a vehicle rear equipped with two storage projections according to a third embodiment.

As in a third embodiment shown in FIG. 5, two sets of the storage projection 22 and the damper stay 30 may be provided on both sides of the vehicle 1 in the width direction, that is, on the left and right sides of the center of the vehicle 1 in the width direction. In the embodiment of FIG. 5, elements that have the same or similar structures and functions as those of the above illustrated embodiment are given the same reference numerals as in FIGS. 1 to 3, and redundant descriptions are omitted. In the structure shown in FIG. 5, the damper stays 30 are capable of applying an urging force to the back door 20 in the opening direction, substantially evenly with respect to the width direction. As a result, the damper stays 30 support the back door 20 in a balanced manner and prevent the opening and closing operations of the back door 20 from being degraded. Also, when the back door 20 is open, the damper stays 30 stably support the back door 20. When the back door 20 is closed, the damper stays 30 are separately accommodated in the respective storage projections 22.

The storage projection 22 does not necessarily have a shape in which the upper surface 22a rises toward the rear end in relation to the upper surface of the back door roof portion 20R. That is, the upper surface 22a may be substantially parallel with the horizontal plane or tilted to decline toward the rear end. Likewise, the damper stay 30 may be substantially parallel with the horizontal plane or tilted to decline toward the rear end.

Therefore, the present examples and embodiments are to be considered as illustrative and not restrictive and the invention is not to be limited to the details given herein, but may be modified within the scope and equivalence of the appended claims.

The invention claimed is:

1. A back door device comprising:
a hinge, which is provided on a roof of a vehicle;
a back door, which is configured to pivot vertically about the hinge to selectively open and close a door opening provided at a rear end of the vehicle; and
a damper stay, which urges the back door in an opening direction, wherein
the hinge is arranged at a position forward of a rear edge of the roof,
the back door includes a back door rear end portion and a back door roof portion, wherein, when the back door is closed, the back door rear end portion forms at least a part of the rear end of the vehicle and the back door roof portion covers a part of the roof that is rearward of the hinge,
the back door roof portion includes a storage projection, which projects upward from an upper surface of the back door roof portion such that the storage projection is capable of storing therein the damper stay,
the damper stay includes a first end, which is connected to the roof at a position rearward of the hinge, and a second end, which is connected to an inner wall of the storage projection, and
when the back door is closed, the damper stay is stored in the storage projection.

2. The back door device according to claim 1, wherein the storage projection stores therein at least one of in-vehicle devices including a car antenna and a high mount stop lamp.

3. The back door device according to claim 1, wherein the storage projection has an upper surface, which rises toward a rear end in relation to the upper surface of the back door roof portion.

4. The back door device according to claim 1, wherein the set of the storage projection and the damper stay is either one that is located at a center of the vehicle in a width direction or is one of two sets of the storage projection and the damper stay that are located on both sides of the vehicle in the width direction.

5. The back door device according to claim 1, wherein the back door roof portion and the storage projections are integrally molded components.

\* \* \* \* \*